(12) United States Patent
Nakagome et al.

(10) Patent No.: US 11,000,952 B2
(45) Date of Patent: May 11, 2021

(54) MORE ENDEARING ROBOT, METHOD OF CONTROLLING THE SAME, AND NON-TRANSITORY RECORDING MEDIUM

(71) Applicant: CASIO COMPUTER CO., LTD., Tokyo (JP)

(72) Inventors: Kouichi Nakagome, Tokorozawa (JP); Takashi Yamaya, Fussa (JP); Keisuke Shimada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 375 days.

(21) Appl. No.: 16/016,325

(22) Filed: Jun. 22, 2018

(65) Prior Publication Data
US 2018/0370039 A1    Dec. 27, 2018

(30) Foreign Application Priority Data

Jun. 23, 2017   (JP) .............................. JP2017-122873

(51) Int. Cl.
*G06F 17/00* (2019.01)
*B25J 9/16* (2006.01)
(Continued)

(52) U.S. Cl.
CPC .............. *B25J 9/1697* (2013.01); *A63H 3/28* (2013.01); *A63H 11/00* (2013.01); *A63H 13/00* (2013.01); *A63H 13/005* (2013.01); *B25J 11/001* (2013.01); *G06K 9/00248* (2013.01); *G06K 9/00302* (2013.01); *G06K 9/00671* (2013.01); *A63H 2200/00* (2013.01); *G05B 2219/45007* (2013.01)

(58) Field of Classification Search
CPC ......... B25J 9/1697; B25J 11/001; A63H 3/28; A63H 11/00; A63H 13/00; A63H 13/005; A63H 2200/00; G06K 9/00248; G06K 9/00302; G06K 9/00671; G05B 2219/45007
USPC ........................................................ 700/259
See application file for complete search history.

(56) References Cited

U.S. PATENT DOCUMENTS 7,626,569 B2 * 12/2009 Lanier ................... G06F 1/1601
                                                              345/156
8,818,556 B2    8/2014 Sanchez et al.
(Continued)

FOREIGN PATENT DOCUMENTS

CN     102609089 A    7/2012
EP     2810748 A1    12/2014
(Continued)

OTHER PUBLICATIONS

Japanese Office Action dated May 14, 2019 (and English translation thereof) issued in counterpart Japanese Application No. 2017-122873.
(Continued)

*Primary Examiner* — Ronnie M Mancho
(74) *Attorney, Agent, or Firm* — Holtz, Holtz & Volek PC

(57) ABSTRACT

A more endearing robot includes an operation unit that causes the robot to operate, a viewing direction determiner that determines whether a viewing direction of a predetermined target is toward the robot or not, and an operation controller that controls the operation unit based on a result of determination by the viewing direction determiner.

22 Claims, 10 Drawing Sheets

(51) Int. Cl.
  *G06K 9/00* (2006.01)
  *B25J 11/00* (2006.01)
  *A63H 11/00* (2006.01)
  *A63H 13/00* (2006.01)
  *A63H 3/28* (2006.01)

(56) References Cited

U.S. PATENT DOCUMENTS

| | | | |
|---|---|---|---|
| 8,880,222 B2 | 11/2014 | Kawamoto et al. | |
| 8,885,882 B1* | 11/2014 | Yin | G06K 9/00248 |
| | | | 382/103 |
| 9,662,788 B2 | 5/2017 | Ishiguro | |
| 9,791,920 B2* | 10/2017 | Kim | H04N 21/4223 |
| 2002/0081937 A1 | 6/2002 | Yamada et al. | |
| 2005/0157908 A1* | 7/2005 | Matsugu | G06K 9/00885 |
| | | | 382/107 |
| 2007/0270074 A1 | 11/2007 | Aochi et al. | |
| 2008/0065468 A1* | 3/2008 | Berg | G06Q 30/02 |
| | | | 705/7.32 |
| 2008/0221877 A1* | 9/2008 | Sumita | G10L 15/22 |
| | | | 704/211 |
| 2009/0043440 A1* | 2/2009 | Matsukawa | G05D 1/0214 |
| | | | 701/25 |
| 2011/0245974 A1 | 10/2011 | Kawamoto et al. | |
| 2012/0182392 A1* | 7/2012 | Kearns | B25J 19/023 |
| | | | 348/46 |
| 2012/0185090 A1 | 7/2012 | Sanchez et al. | |
| 2013/0073087 A1* | 3/2013 | Irmler | B25J 11/0015 |
| | | | 700/259 |
| 2014/0347265 A1* | 11/2014 | Aimone | A61M 21/00 |
| | | | 345/156 |
| 2015/0032254 A1 | 1/2015 | Ishiguro | |
| 2016/0179205 A1* | 6/2016 | Katz | G06F 3/017 |
| | | | 345/156 |
| 2016/0191995 A1* | 6/2016 | el Kaliouby | G16H 50/70 |
| | | | 725/12 |
| 2017/0076486 A1* | 3/2017 | Aizawa | G06F 1/163 |
| 2017/0352351 A1 | 12/2017 | Kimura | |
| 2018/0067309 A1* | 3/2018 | Shimura | G06F 3/0304 |
| 2018/0072226 A1* | 3/2018 | Bunch | B60R 1/00 |
| 2018/0164610 A1* | 6/2018 | Liang | A61B 3/0091 |

FOREIGN PATENT DOCUMENTS

| | | |
|---|---|---|
| JP | 2002307354 A | 10/2002 |
| JP | 2003071761 A | 3/2003 |
| JP | 2005279895 A | 10/2005 |
| JP | 2005279896 A | 10/2005 |
| JP | 2012239557 A | 12/2012 |
| JP | 2013099800 A | 5/2013 |
| JP | 2016224302 A | 12/2016 |
| WO | 2016068262 A1 | 5/2016 |

OTHER PUBLICATIONS

Extended European Search Report (EESR) dated Mar. 19, 2019 issued in counterpart European Application No. 18179360.5.
Chinese Office Action (and English language translation thereof) dated Jan. 29, 2021, issued in counterpart Chinese Application No. 201810632789.0.

* cited by examiner

FIG. 5

| EMOTION | SPECIFIC SOLO OPERATION |
|---|---|
| LONELY (calm<0, excite<0) | LOOK FOR SOMETHING, MOVE TO CORNER OF ROOM, AND GAZE |
| | PATROL AROUND ROOM SEVERAL TIMES |
| | WALK SLOWLY |
| | IDLE WITH BORED AND SAD FACE |
| MOTIVATED (calm<0, excite≧0) | MOVE TO CORNER OF ROOM AND WANDER AROUND TO SHOW DESIRE TO GO OUTSIDE |
| | ACT IN ONE MAN SHOW |
| | ENGAGE IN DAYDREAM |
| | PLAYACT AS DETECTIVE |
| | PRACTICE DANCING |
| HAPPY (calm≧0, excite≧0) | SING |
| | TAP TO RHYTHM |
| | SING AND DANCE |
| | RUN AROUND |
| | PLAYACT AS MONSTER |
| | WALK BACKWARD |
| | PERFORM EXERCISE |
| PEACEFUL (calm≧0, excite<0) | GAZE OUT WINDOW |
| | STRETCH UP |
| | SLEEP / GIVE YAWN |
| | SWAY BODY |
| | STARE INTO SPACE AND SUDDENLY MAKE LOUD SOUND |

FIG. 6

| CONDITION | SPECIFIC SOLO OPERATION |
|---|---|
| HEARING MUSIC | CHANGE FACIAL EXPRESSION AND WANDER AROUND |
| HEARING CONVERSATION OF PEOPLE | TWITCH EARS |
| BEING PATTED BEFORE RECOGNIZING PERSON | GET SURPRISED AND LOOK AROUND |
| FINDING NEW OBJECT DURING DISPLACEMENT (ONE SOLO OPERATION IS SELECTED DEPENDING ON EMOTIONAL VALUES OR RANDOM NUMBERS) | STARE AT OBJECT |
| | PLAY BY HANDLING OBJECT |
| | HIT OBJECT WITH TAIL TO MAKE SOUND |
| FINDING TV TO BE ON | STARE AT TV AND REACT WITH TAIL, EARS, AND FACIAL EXPRESSION |
| FINDING OBJECT THAT MAKES SOUND | STARE AT OBJECT AND REACT WITH TAIL, EARS, AND FACIAL EXPRESSION |
| HEARING WORD "DOG" | BARK LIKE DOG |
| AT HIGH TEMPERATURE | MUTTER "IT'S HOT" WITH EXHAUSTED FACE |
| AT LOW TEMPERATURE | MUTTER "IT'S COLD" AND SHIVER |
| AT BED TIME | RETURN TO CHARGING STATION AND SLEEP |
| AWAKEN EARLIER THAN USUAL | MUTTER SOMETHING AND STAY AT CHARGING STATION |
| NOT AWAKEN EVEN AFTER WAKE-UP TIME | WAKE UP ALONE AND LEAVE CHARGING STATION |
| ON NEW YEAR OR BIRTHDAY MORNING | SAY WORDS RELATED TO DATE |

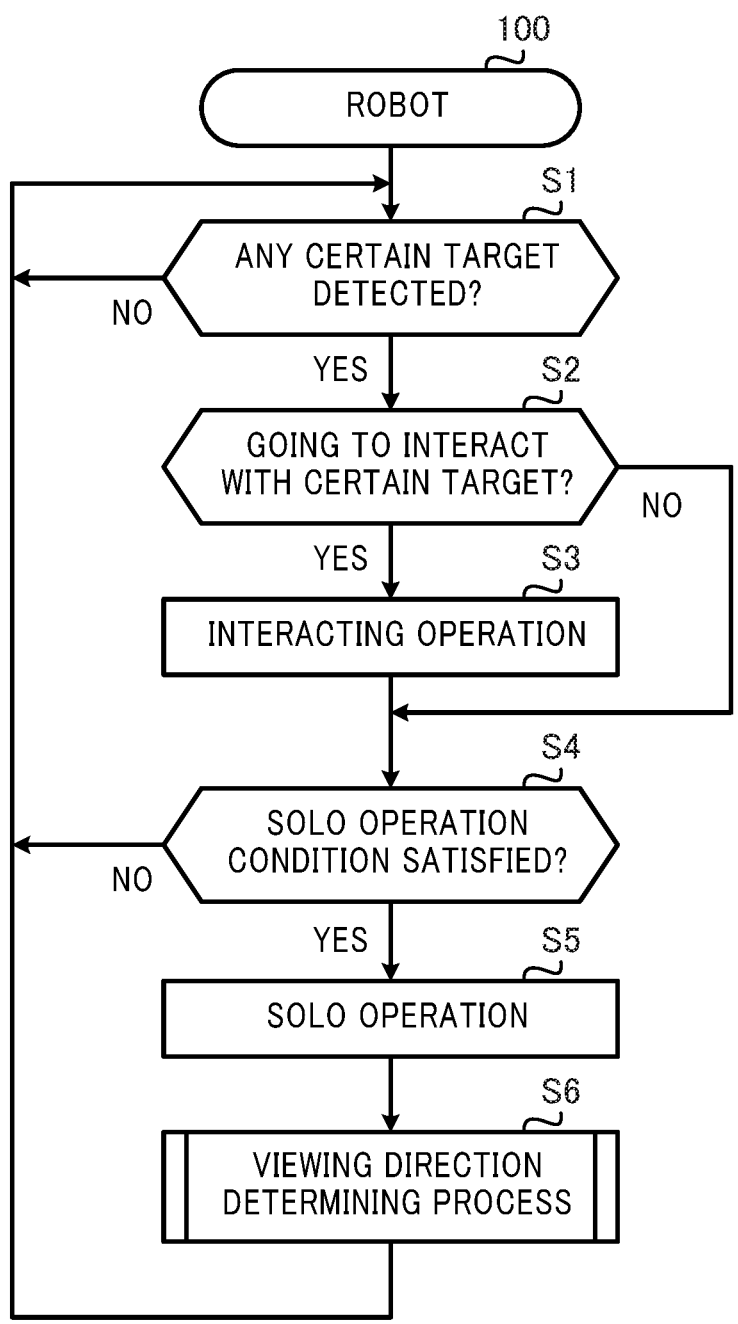

MORE ENDEARING ROBOT, METHOD OF CONTROLLING THE SAME, AND NON-TRANSITORY RECORDING MEDIUM

CROSS-REFERENCE TO RELATED APPLICATION

This application is based upon and claims the benefit of priority from the prior Japanese Patent Application No. 2017-122873, filed on Jun. 23, 2017, the entire contents of which are incorporated herein by reference.

FIELD

This application relates to a more endearing robot, a method of controlling the robot, and a non-transitory recording medium.

BACKGROUND

Robots that communicate with humans are known. For example, Unexamined Japanese Patent Application Kokai Publication No. 2012-239557 discloses a robot that serves as a pet-like toy having a shape representing an animal. The robot disclosed in Unexamined Japanese Patent Application Kokai Publication No. 2012-239557 includes a liquid crystal display and a touch sensor at a position of the face. A petting operation on a face image displayed on the liquid crystal display varies the expression of the face image and causes a head and ears to sway from side to side.

SUMMARY

A robot according to a first aspect of the disclosure includes: an operation unit that causes the robot to operate; a viewing direction determiner that determines whether a viewing direction of a predetermined target is toward the robot or not; and an operation controller that controls the operation unit based on a result of determination by the viewing direction determiner.

A method of controlling a robot according to a second aspect of the disclosure includes: causing the robot to operate; determining whether a viewing direction of a predetermined target is toward the robot or not; and controlling operation of the robot based on a result of determination in the determining.

A non-transitory recording medium according to a third aspect of the disclosure stores a program thereon. The program causes a computer of a robot to function as: an operation unit that causes the robot to operate; a viewing direction determiner that determines whether the viewing direction of a predetermined target is toward the robot or not; and an operation controller that controls the operation unit based on a result of determination by the viewing direction determiner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a first table illustrating exemplary solo operations executed by the robot according to the embodiment of the disclosure;

FIG. 6 is a second table illustrating the exemplary solo operations executed by the robot according to the embodiment of the disclosure;

FIG. 10 is a flowchart illustrating a robot controlling process executed by the robot according to the embodiment of the disclosure.

DETAILED DESCRIPTION

Figure 1:
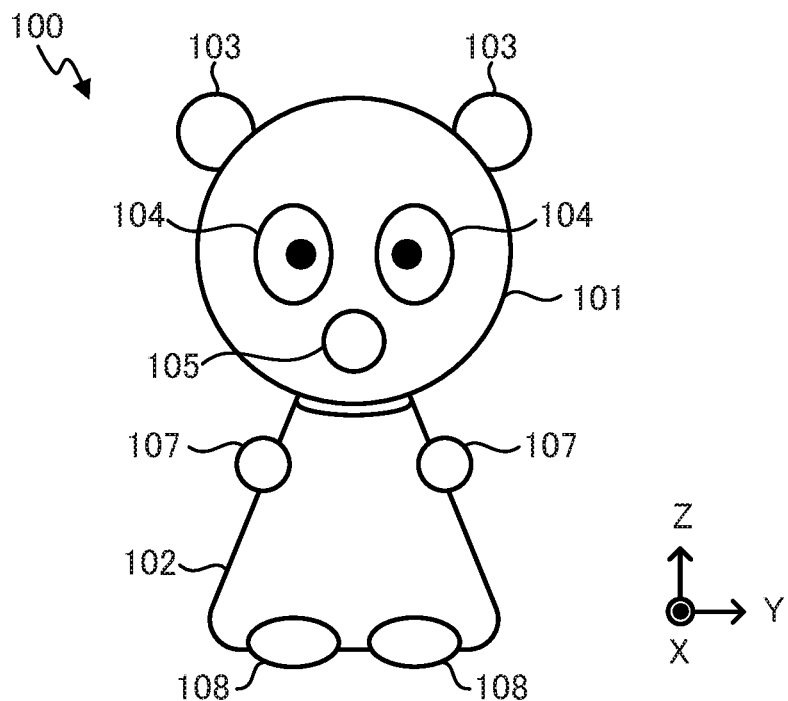
FIG. 1 is a front view of a robot according to an embodiment of the disclosure.

Embodiments of the disclosure will now be described with reference to the accompanying drawings. The identical or corresponding components are provided with the same reference character in the drawings.

Figure 2:
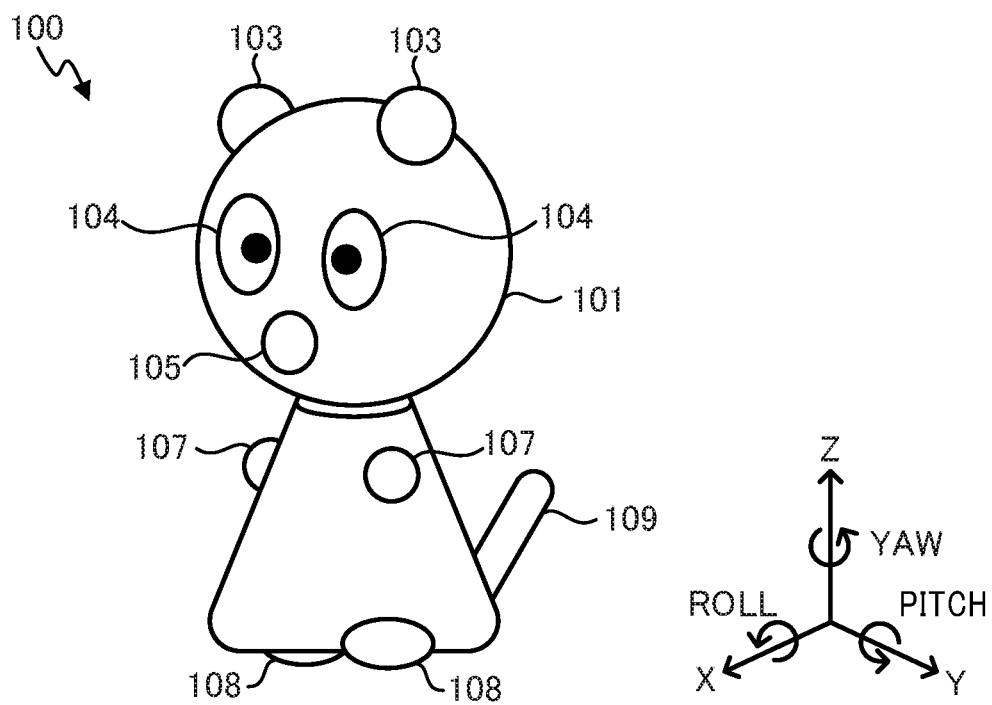
FIG. 2 is a perspective view of the robot according to the embodiment of the disclosure.

FIGS. 1 and 2 illustrate the appearance of a robot 100 according to an embodiment of the disclosure. The robot 100 is a pet robot similar to a pet. The robot 100 has a shape representing an animal and autonomously operates in accordance with a predetermined operational program.

The robot 100 executes various operations in response to external stimuli, such as a call and contact from a predetermined target that exists outside of the robot 100. The robot 100 can thus communicate and interact with the predetermined target. The predetermined target exists outside of the robot 100 and communicates and interacts with the robot 100. Specific examples of the predetermined target include a user who owns the robot 100, people around the user (for example, family members and friends of the user), animals around the user (for example, pets kept by the user or other people), and robots other than the robot 100. The predetermined target can also be called communication target, communication partner, interaction target, or interaction partner, for example.

With reference to FIGS. 1 and 2, the robot 100 has a three-dimensional shape that represents a small dog in appearance. The robot 100 is mainly composed of, for example, a hard synthetic resin, such as plastic. The robot 100 includes a head 101, a body 102, ears 103, eyes 104, a mouth 105, arms 107, legs 108, and a tail 109.

The head 101, the ears 103, the arms 107, the legs 108, and the tail 109 can be moved by driving members installed in the robot 100. The head 101 is attached to the body 102 with a neck joint provided at the position of the neck, such that the head 101 can rotate in the three directions (pitch, roll, and yaw directions). Each of the eyes 104 is provided with a display 117 that displays an eye image (for example, an eyeball image). The mouth 105 is provided with an imager 115a that captures an image of an object in front of the robot 100.

Figure 3:
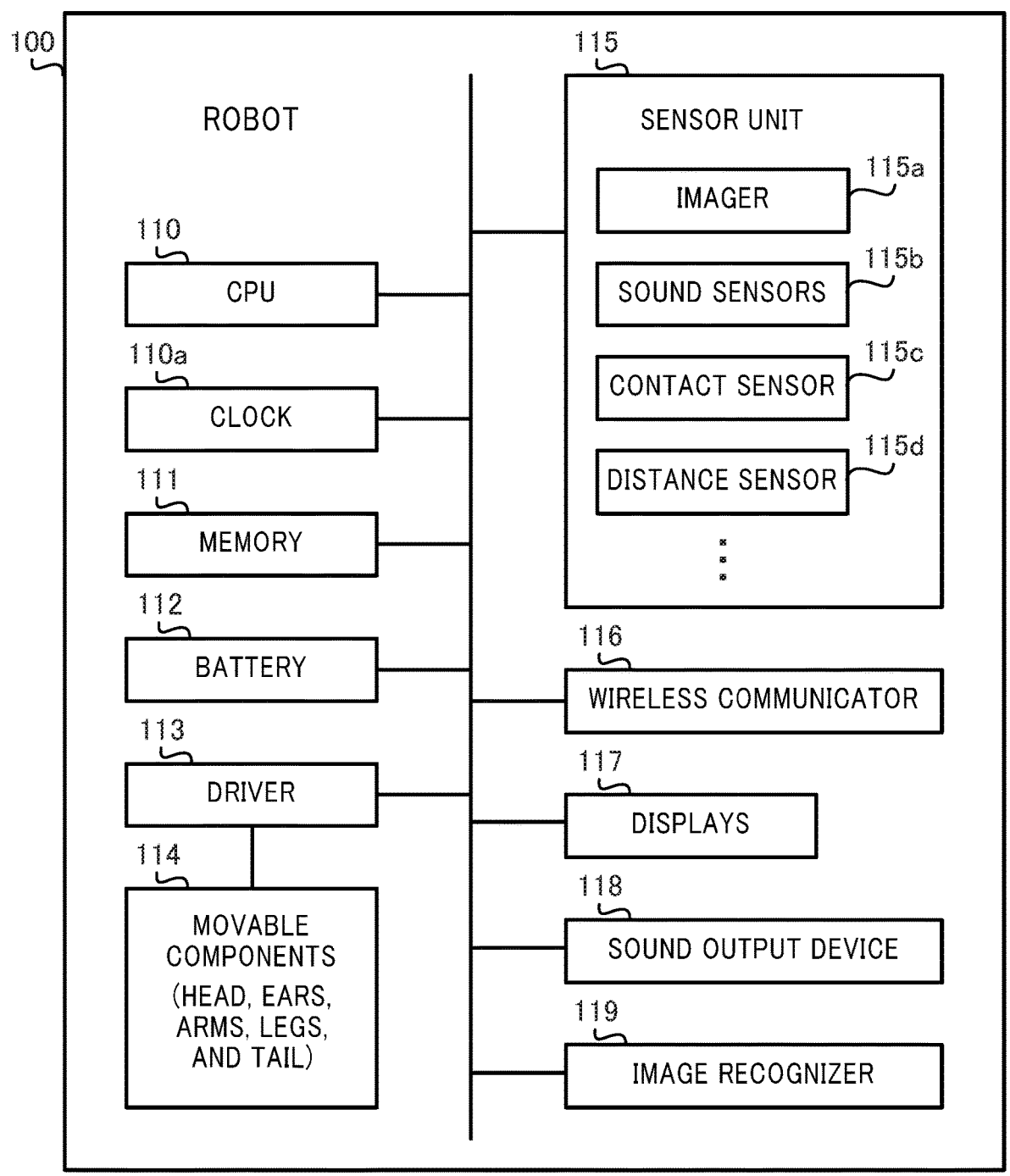
FIG. 3 is a block diagram illustrating the hardware configuration of the robot according to the embodiment of the disclosure.

FIG. 3 illustrates hardware configuration of the robot 100. With reference to FIG. 3, the robot 100 includes a central processing unit (CPU) 110, a clock 110a, a memory 111, a battery 112, a driver 113, movable components 114, a sensor unit 115, a wireless communicator 116, displays 117, a sound output device 118, and an image recognizer 119.

The CPU 110 is the central processing unit, such as a microprocessor, that executes various processes and calculations. The CPU 110 is connected to individual components of the robot 100 via system buses serving as transmission paths for transferring instructions and data and thus controls the entire robot 100. The clock 110a includes a real time clock (RTC).

The memory 111 includes a random access memory (RAM) functioning as a working memory of the CPU 110, a read-only memory (ROM), and a non-volatile memory, such as a flash memory. The memory 111 stores programs and data for execution of various processes by the CPU 110, for example, an operating system (OS) and application programs. The memory 111 also stores data generated or acquired through the various processes of the CPU 110.

The battery 112 is a rechargeable battery that stores electrical energy and supplies electrical power to individual components of the robot 100. The battery 112 is recharged by a charging station when the robot 100 is returned to the charging station.

The driver 113 includes driving members, such as motors and actuators for driving the movable components 114 of the robot 100, and a drive circuit for driving the driving members. The movable components 114 can move in certain manners. Specifically, the movable components 114 include the head 101, the ears 103, the arms 107, the legs 108, and the tail 109. The CPU 110 transmits a control signal to the drive circuit based on the operational program. In accordance with the control signal transmitted from the CPU 110, the drive circuit supplies the driving members with a pulse signal for driving the driving members. In accordance with the pulse signal supplied from the drive circuit, the driving members drive the movable components 114.

The driving of the movable components 114 by the driver 113 can achieve various operations of the robot 100. For example, movements of the arms 107 and the legs 108 enable the robot 100 to move forward or rearward or turn to another direction. In addition, movements of the head 101, movements of the ears 103, and wagging of the tail 109, for example, enable the robot 100 to operate and behave like a real dog.

The sensor unit 115 includes a plurality of sensors for detecting physical quantities inside or around the robot 100. With reference to FIG. 3, the sensor unit 115 includes the imager 115a that captures an image representing the circumference of the robot 100, sound sensors 115b that detect a sound, a contact sensor 115c that detects the contact with the robot 100, and a distance sensor 115d that measures a distance to a surrounding object. The sensor unit 115 further includes an acceleration sensor that detects a movement of the robot 100, a gyro sensor that detects a rotation of the robot 100, a geomagnetic sensor that determines an orientation of the robot 100, a temperature sensor that determines an temperature around the robot 100, and an atmospheric pressure sensor that determines an atmospheric pressure around the robot 100 (which are not shown).

The imager 115a is a so-called camera and provided to the mouth 105. The imager 115a includes an image capturer that collects light reflected from a subject and captures an image of the subject, and an image processor that processes the image captured by the image capturer. The sound sensors 115b are provided to the head 101 and detect voices from the predetermined target and environmental sounds, for example. The robot 100 includes a plurality of microphones (not shown) along the surface of the head 101 that function as the sound sensors 115b. These microphones can efficiently detect sounds occurring around the robot 100. The other sensors are provided to certain components of the robot 100 and acquire information indicating a state inside or around the robot 100. These sensors thus enable the sensor unit 115 to acquire the information indicating the state inside or around the robot 100 and provide the information to the CPU 110.

The wireless communicator 116 includes an interface for wireless communication with external apparatuses. The wireless communicator 116 executes the wireless communication with the charging station under the control of the CPU 110 in accordance with a communication standard, such as a wireless local area network (LAN) standard (for example, a wireless fidelity (Wi-Fi) standard) or a Bluetooth (registered trademark) standard.

Each of the displays 117 is, for example, a liquid crystal display, an organic electroluminescence (EL) display, or a light emitting diode (LED) display. The displays 117 are provided to the positions of the respective eyeballs of the eyes 104 and display various images appropriate for the situations under the control of a display driving circuit (not shown).

The sound output device 118 includes a speaker and a sound output interface. The sound output device 118 converts audio data generated by the CPU 110 into the sound and outputs the sound to the outside. The speaker is provided to the head 101. The sound output device 118 outputs various sounds including an animal cry and a human language. For example, the robot 100 collects a speech of the predetermined target with the sound sensors 115b and then outputs the sound corresponding to contents of the speech of the predetermined target through the sound output device 118. The robot 100 can thus have a simple conversation with the predetermined target.

The image recognizer 119 includes an image processor, such as a digital signal processor (DSP) or a graphics processing unit (GPU), and a buffer memory that temporarily stores the image to be processed. The image recognizer 119 analyzes the image captured by the imager 115a and recognizes, for example, a person, a face, an object, or a pattern contained in the image captured by the imager 115a based on well-known image recognition techniques.

Figure 4:
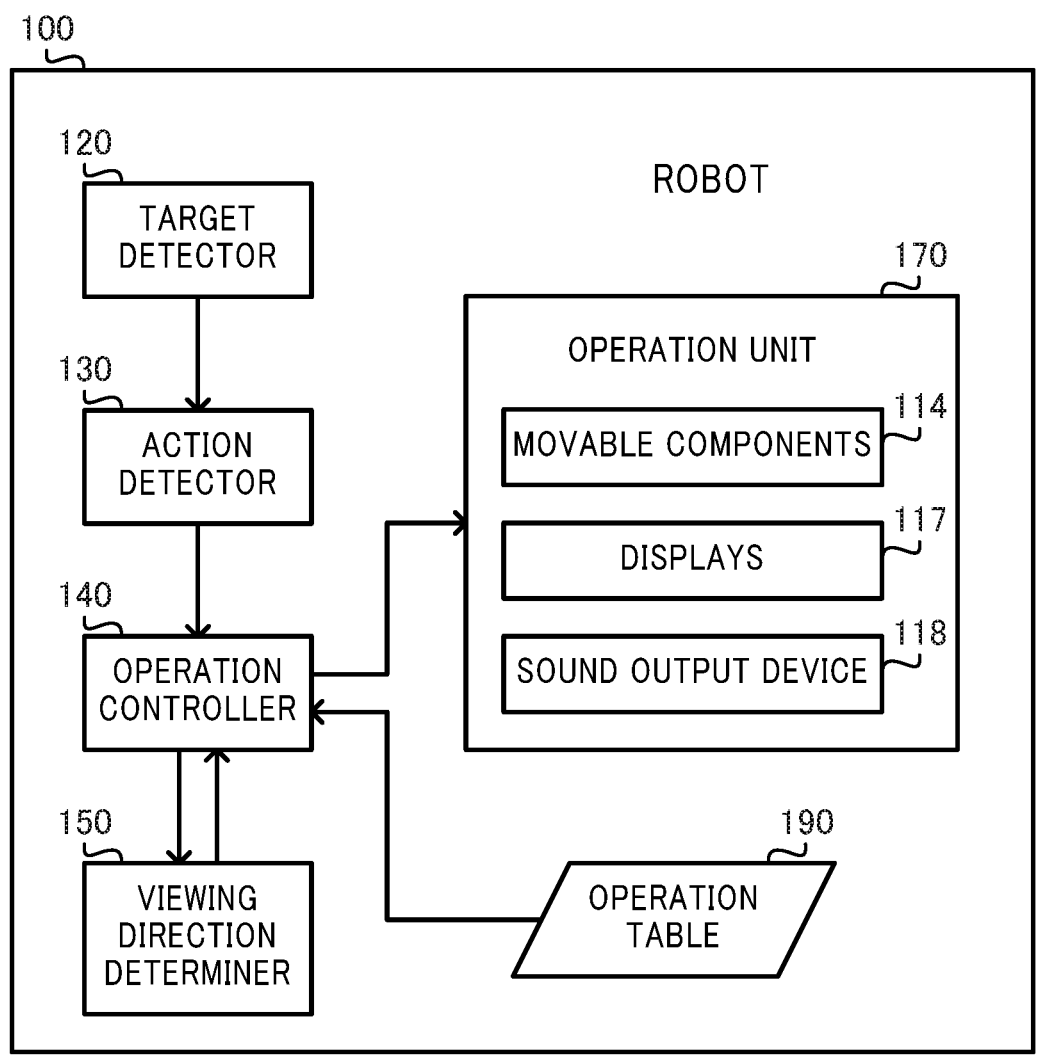
FIG. 4 is a block diagram illustrating the functional configuration of the robot according to the embodiment of the disclosure.

The functional configuration of the robot 100 will now be described with reference to FIG. 4. The robot 100 includes a target detector 120, an action detector 130, an operation controller 140, and a viewing direction determiner 150 in terms of function, as illustrated in FIG. 4. The CPU 110 reads programs stored in the ROM, loads the programs into the RAM, and executes and controls the programs to function as the above-mentioned components.

The target detector 120 detects the predetermined target that exists outside of the robot 100. The predetermined target indicates the interaction partner (the communication partner) that interacts with the robot 100, for example, the user who owns the robot 100, the person around the user, or the animal.

The target detector 120 captures the image representing the circumference of the robot 100 with the imager 115*a* provided to the mouth 105. The target detector 120 then analyzes the image captured by the imager 115*a* with the image recognizer 119 to determine whether any human or animal is contained in the image or not. The target detector 120 can thus be achieved by cooperation of the CPU 110 with the imager 115*a* and the image recognizer 119.

The action detector 130 detects an action of the predetermined target to the robot 100. The action of the predetermined target to the robot 100 indicates the action, such as a talk or contact, of the predetermined target for a purpose of interaction (communication) with the robot 100. Examples of the action of the predetermined target to the robot 100 include calling the robot 100, touching the surface of the robot 100, and gesturing in front of the robot 100. The action detector 130 detects such actions of the predetermined target with the individual sensors of the sensor unit 115.

Specifically, in a case in which the predetermined target calls the robot 100, the action detector 130 detects a voice from the predetermined target with the sound sensors 115*b*. In a case in which the predetermined target touches the robot 100, the action detector 130 detects the contact with the contact sensor 115*c*. Furthermore, in a case in which the predetermined target gestures in front of the robot 100, the action detector 130 detects a gesture with the imager 115*a*. The action detector 130 can thus be achieved by the cooperation of the CPU 110 with the individual sensors of the sensor unit 115.

The operation controller 140 controls the operation unit 170 and causes the operation unit 170 to execute operations defined in an operation table 190. The operation unit 170 includes the movable components 114, the displays 117, and the sound output device 118. The operation unit 170 causes the robot 100 to operate by moving the movable components 114, displaying images on the displays 117, or outputting the sound through the sound output device 118. The operation table 190 that defines operations of the operation unit 170 is preliminarily stored in the memory 111. The operation controller 140 causes the operation unit 170 to execute various operations appropriate for the situations with reference to the operation table 190. The operation controller 140 can thus be achieved by the cooperation of the CPU 110 with the driver 113, the movable components 114, the displays 117, and the sound output device 118.

In a case in which the action detector 130 detects any action of the predetermined target to the robot 100, the operation controller 140 causes the operation unit 170 to execute the operation for responding to the detected action. Such the operation is provided for the purpose of interaction (communication) with the predetermined target and is also called an interacting operation (an interacting action) or a responding operation (a responding action).

Specifically, in a case in which the action detector 130 detects any speech from the predetermined target, the operation controller 140 causes the sound output device 118 to output the sound corresponding to the detected speech, turns the head 101 to the predetermined target, or moves the arms 107 and legs 108 to approach the predetermined target. In a case in which the action detector 130 detects any contact, the operation controller 140 wags the tail 109 or displays certain images on the displays 117. Furthermore, in a case in which the action detector 130 detects any gesture of the predetermined target, the operation controller 140 causes the sound output device 118 to output the sound corresponding to the detected gesture or displays the certain images on the displays 117.

As described above, the operation controller 140 causes the robot 100 to execute various interacting operations in response to different actions of the predetermined target detected by the action detector 130. The predetermined target can thus enjoy communicating with the robot 100. The operation table 190 defines the correspondence relationship between actions of the predetermined target and interacting operations to be executed by the robot 100 in a case in which the action detector 130 detects the respective actions. The operation controller 140 refers to the operation table 190 and determines the interacting operation to be executed by the operation unit 170.

In contrast, in a case in which the action detector 130 detects no action of the predetermined target to the robot 100, the operation controller 140 causes the robot 100 to execute a solo operation different from the interacting operation. The solo operation indicates an operation that the robot 100 executes alone, independently from the predetermined target, which is a spontaneous operation without interaction (communication) with the predetermined target. The solo operation is also called solo action or solo play.

In other words, in a case in which the robot 100 is going to interact with any target that exists around the robot 100, the operation controller 140 causes the robot 100 to execute the above-described interacting operation. In contrast, in a case in which the robot 100 is not interacting with any target that exists around the robot 100, the operation controller 140 causes the robot 100 to execute the solo operation. The robot 100 can thus naturally behave like a real pet and create a more endearing impression.

FIGS. 5 and 6 illustrate exemplary solo operations defined in the operation table 190. With reference to FIGS. 5 and 6, the operation table 190 defines the solo operation to be executed by the robot 100 in each condition.

FIG. 5 illustrates the exemplary solo operations in a case where the predetermined target exists around the robot 100 but does not interact with the robot 100. After elapse of a predetermined interval from the last detection of the action of the predetermined target to the robot 100 by the action detector 130, the operation controller 140 causes the robot 100 to execute any of the solo operations listed in FIG. 5. Specifically, the operation controller 140 causes the robot 100 to execute the solo operation, which varies depending on information on emotions of the robot 100. The information on the emotions of the robot 100 indicates information representing feelings (for example, delight, anger, sorrow, and pleasure) of the robot 100, which is determined to simulate the real animal.

Specifically, as illustrated in FIG. 5, the information on the emotions of the robot 100 indicates any of four emotions: "lonely", "motivated", "happy", and "peaceful", which are defined based on a first emotional value "calm" representing a level of calmness and a second emotional value "excite" representing a level of excitement. The operation controller 140 varies the first and the second emotional values and thus changes the emotions of the robot 100 in response to the actions of the predetermined target during interaction between the robot 100 and the predetermined target and depending on other situations.

For example, in a case in which the robot 100 expresses the "lonely" feeling, the operation controller 140 causes the robot 100 to execute any of the solo operations including "Look for something, move to a corner of a room, and gaze". In a case in which the robot 100 expresses the "motivated" feeling, the operation controller 140 causes the robot 100 to execute any of the solo operations including "Move to a corner of a room and wander around to show a desire to go outside". In a case in which the robot 100 expresses the "happy" feeling, the operation controller 140 causes the robot 100 to execute any of the solo operations including "Sing". In a case in which the robot 100 expresses the "peaceful" feeling, the operation controller 140 causes the robot 100 to execute any of the solo operations including "Gaze out a window". The solo operation to be executed is selected at random from among the solo operations executable for each emotion.

FIG. 6 illustrates example of solo operations induced by a surrounding environment of the robot 100 or time. In a case in which the action detector 130 detects no action of the predetermined target to the robot 100 and in a case in which at least one of the surrounding environment of the robot 100 and the time satisfies a specified condition, the operation controller 140 causes the robot 100 to execute corresponding one of the solo operations listed in FIG. 6.

The surrounding environment of the robot 100 indicates information on the outside of the robot 100 except for the predetermined target that can interact with the robot 100, for example, sound volume, temperature, atmospheric pressure, brightness, and existence of obstacle. The surrounding environment is detected by, for example, the sound sensors 115*b*, the contact sensor 115*c*, the distance sensor 115*d*, the temperature sensor, and the atmospheric pressure sensor. The time indicates information on current time, date, or season, for example, and is measured by the clock 110*a*. The specified condition indicates a condition related to the surrounding environment or the time. As listed in FIG. 6, examples of the specified condition include conditions related to the surrounding environment, such as "Hearing music" and "Hearing a conversation of people", and conditions related to the time, such as "At a bed time" and "On a new year morning or a birthday morning".

In a case in which at least one of the surrounding environment of the robot 100 and the time satisfies the specified condition, the operation controller 140 causes the robot 100 to execute the solo operation corresponding to the satisfied condition. For example, in a case in which the condition of "Hearing music" is satisfied, the operation controller 140 causes the robot 100 to execute the solo operation of "Change a facial expression and wander around". In a case in which the condition of "Being petted before recognizing a person" is satisfied, the operation controller 140 causes the robot 100 to execute the solo operation of "Get surprised and look around". As described above, in response to an external stimulus, such as the surrounding environment or the time, the operation controller 140 causes the robot 100 to execute the solo operation corresponding to the stimulus by operating at least one of the movable components 114, the displays 117, and the sound output device 118 included in the operation unit 170.

The description of the functional configuration of the robot 100 illustrated in FIG. 4 will be resumed. The viewing direction determiner 150 determines whether the viewing direction of the predetermined target is toward the robot 100 during execution of the solo operation of the robot 100 or not. To determine whether the viewing direction of the predetermined target is toward the robot 100 or not, the viewing direction determiner 150 executes three processes: (1) detection of a face, (2) determination of an orientation of the face, and (3) detection of the viewing direction.

Figure 7A:
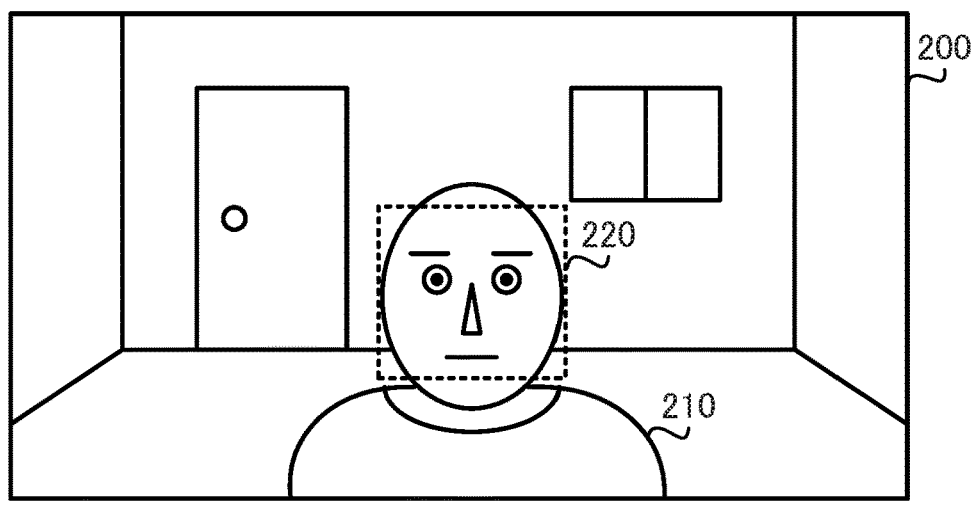
FIGS. 7A to 7C each illustrate an exemplary captured image according to the embodiment of the disclosure.
Figure 7B:
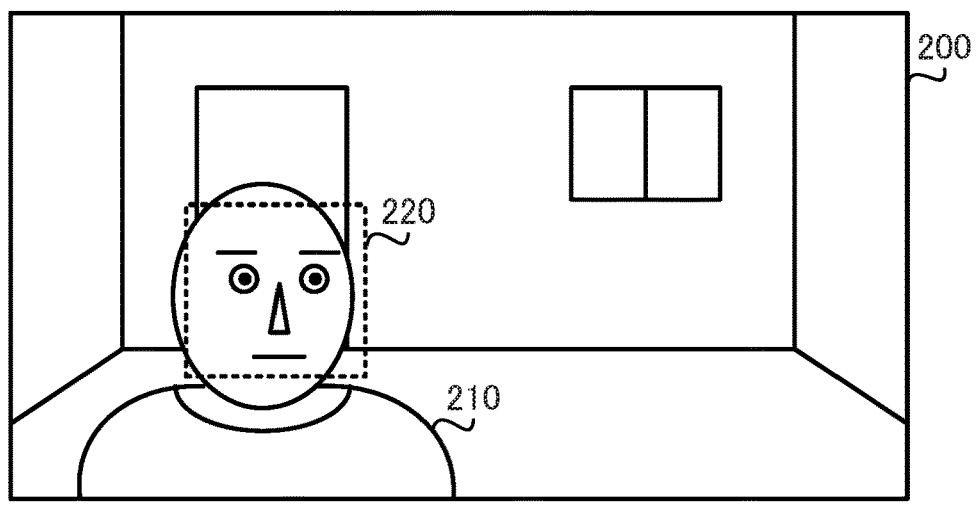
Figure 7C:
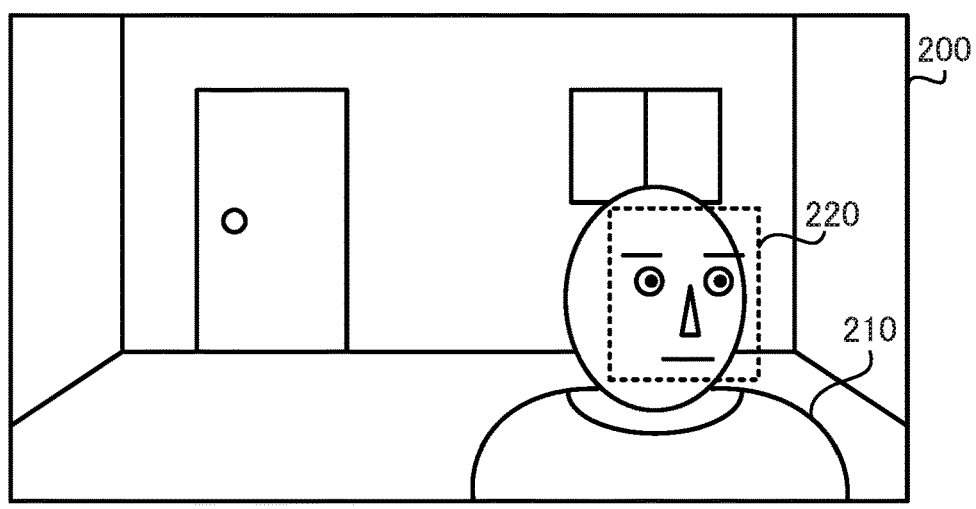

First, the viewing direction determiner 150 detects the face from the image captured by the imager 115*a*. FIGS. 7A to 7C each illustrate an exemplary captured image 200 containing a user 210 (a predetermined target). FIG. 7A illustrates the image 200 of the user 210 captured from the front, and FIGS. 7B and 7C each illustrate the image 200 of the user 210 captured in an oblique direction. The viewing direction determiner 150 detects a face area 220 corresponding to the face of the user 210 with the image recognizer 119 by a well-known face recognition technique, for example, from the captured image 200 illustrated in any of FIGS. 7A to 7C.

Specifically, the viewing direction determiner 150 specifies pixels having a skin color from the pixels contained in the captured image 200 and determines an area of the specified pixels having the skin color to be the face area 220. Alternatively, the viewing direction determiner 150 may extract facial parts (for example, eyes, a nose, and a mouth) as characteristic points from the captured image 200 and determine the face area 220 based on positions of the extracted facial parts. The viewing direction determiner 150 thus detects the face of the user 210 from the captured image 200.

Second, the viewing direction determiner 150 determines an orientation of the face detected from the captured image 200 by a well-known technique. Specifically, the viewing direction determiner 150 determines the orientation of the face in three directions (pitch, roll, and yaw directions) based on the positional relationship between the facial parts (for example, the eyes, the nose, and the mouth) in the determined face area 220.

For example, in the captured image 200 illustrated in FIG. 7A, the face of the user 210 is directed to the front, that is, directed to the robot 100. In this case, the viewing direction determiner 150 determines the orientation of the face in each of the pitch, roll, and yaw directions to be 0°. In contrast, in the captured image 200 illustrated in FIG. 7B or 7C, the face of the user 210 is inclined in the yaw direction while not inclined in the pitch or roll direction. In this case, the viewing direction determiner 150 determines the orientation of the face to be inclined by −15° in the yaw direction, for example. The viewing direction determiner 150 thus determines the orientation of the face of the user 210 in the captured image 200.

Third, the viewing direction determiner 150 detects the viewing direction of the user 210 in the captured image 200 by a well-known technique. Specifically, the viewing direction determiner 150 specifies the eyes contained in the face area 220 and detects the position of irises (pupils) in the respective specified eyes. The viewing direction determiner 150 then determines the viewing direction of the user 210, that is, the direction of view of the user 210 based on the positions of the irises in the eyes.

On the basis of the above-described three processes: (1) detection of the face, (2) determination of the orientation of the face, and (3) detection of the viewing direction, the viewing direction determiner 150 determines whether the viewing direction of the predetermined target is toward the robot 100 or not. For example, in a case in which the detected face is located in a center of the captured image 200 and in a case in which the face and the viewing direction are toward the front, the viewing direction determiner 150 determines that the viewing direction of the predetermined target is toward the robot 100. In addition, in a case in which the detected face is located in a position other than the center of the captured image 200 and in a case in which the face or the viewing direction is toward the imager 115*a*, the viewing direction determiner 150 also determines that the viewing direction of the predetermined target is toward the robot 100. The viewing direction determiner 150 thus determines whether the viewing direction of the predetermined target is toward the robot 100 or not based on the image of the predetermined target captured by the imager 115*a*.

In a case of determining that the viewing direction of the predetermined target is toward the robot 100 during the execution of the solo operation by the robot 100, the viewing direction determiner 150 starts measuring time with the clock 110*a*. The viewing direction determiner 150 then determines whether the viewing direction of the predetermined target is toward the robot 100 at least for a predetermined duration or not. The predetermined duration is, for example, a period approximately from one to several seconds. The predetermined duration is set and stored in the memory 111 in advance. The viewing direction determiner 150 can thus be achieved by the cooperation of the CPU 110 with the imager 115*a*, the image recognizer 119, and the clock 110*a*.

In contrast, the viewing direction determiner 150 does not determine whether the viewing direction of the predetermined target is toward the robot 100 or not while the robot 100 is halting the solo operation. In other words, during execution of the interacting operation by the robot 100 with the predetermined target, the interacting operation is prioritized over the determination on the viewing direction of the predetermined target, and the viewing direction determiner 150 thus does not execute the determination.

The operation controller 140 controls the operation unit 170 based on a result of determination by the viewing direction determiner 150. Specifically, in a case in which the viewing direction determiner 150 determines that the viewing direction of the predetermined target is toward the robot 100 at least for the predetermined duration, the operation controller 140 causes the operation unit 170 to execute a first operation for responding to the viewing direction.

The first operation indicates an operation for responding to the viewing direction of the predetermined target toward the robot 100 and is preliminarily defined as a part of the operation table 190. Specific examples of the first operation include (1) moving the movable components 114, (2) changing the images displayed on the displays 117, and (3) outputting the sound through the sound output device 118. In a case in which the viewing direction determiner 150 determines that the viewing direction of the predetermined target is toward the robot 100 at least for the predetermined duration, the operation controller 140 refers to the operation table 190 and causes the operation unit 170 to execute at least one of the operations defined in the operation table 190 as the first operation.

Figure 8A:
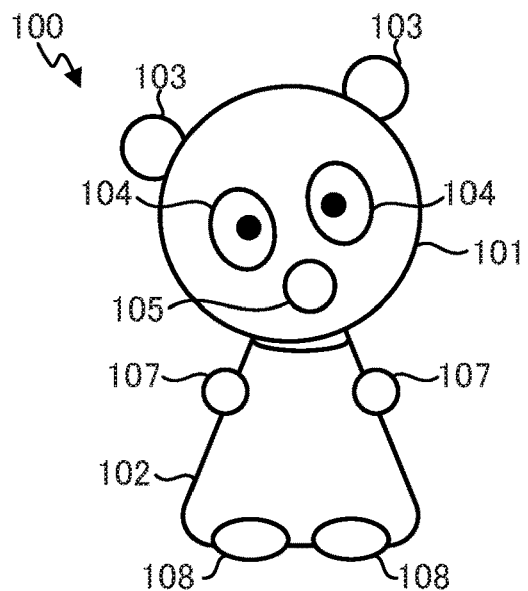
FIGS. 8A to 8C each illustrate an exemplary movement of a movable component of the robot according to the embodiment of the disclosure.
Figure 8B:
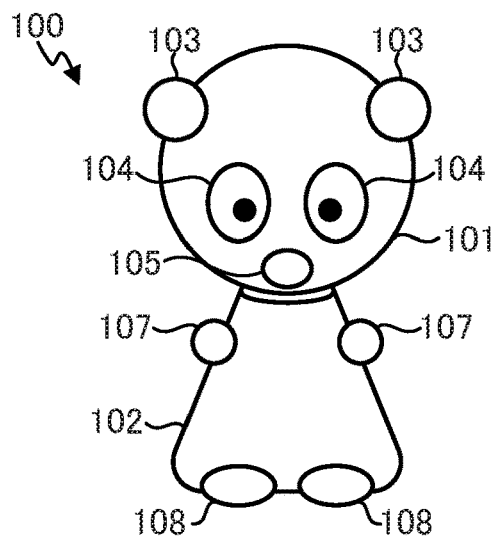
Figure 8C:
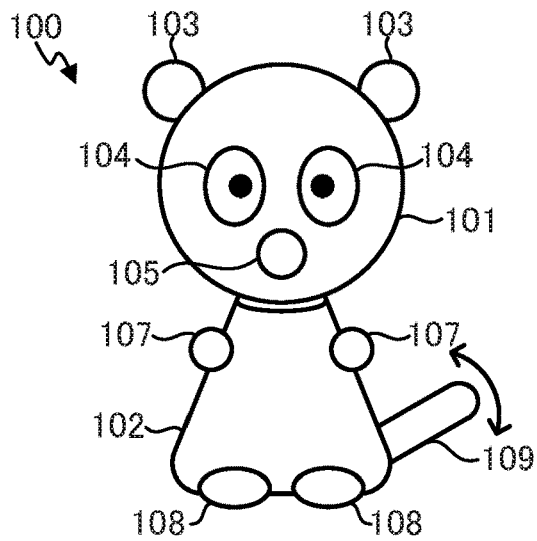

(1) First, the operation controller 140 causes the operation unit 170 to execute the first operation by moving the movable components 114. Specifically, the operation controller 140 causes the driver 113 to drive the neck joint to move the head 101. For example, as illustrated in FIG. 8A, the operation controller 140 may rotate and incline the head 101 in the roll direction in the first operation. Alternatively, as illustrated in FIG. 8B, the operation controller 140 may rotate and nod the head 101 in the pitch direction. Alternatively, the operation controller 140 may cause the head 101 to face the predetermined target. Alternatively, as illustrated in FIG. 8C, the operation controller 140 may wag the tail 109 for the predetermined target in the first operation.

Figure 9A:
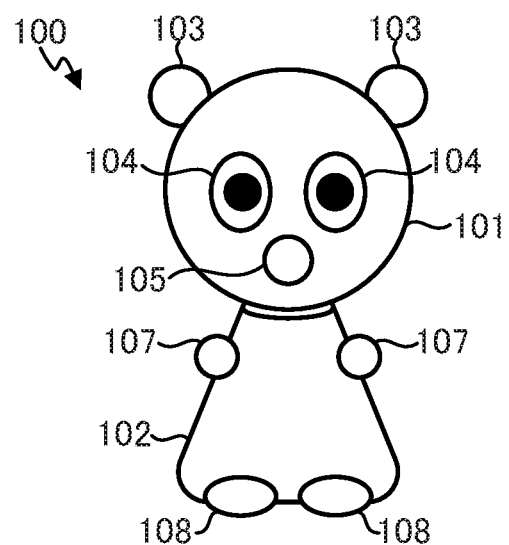
FIGS. 9A to 9C each illustrate an exemplary change in images displayed at eyes of the robot according to the embodiment of the disclosure.
Figure 9B:
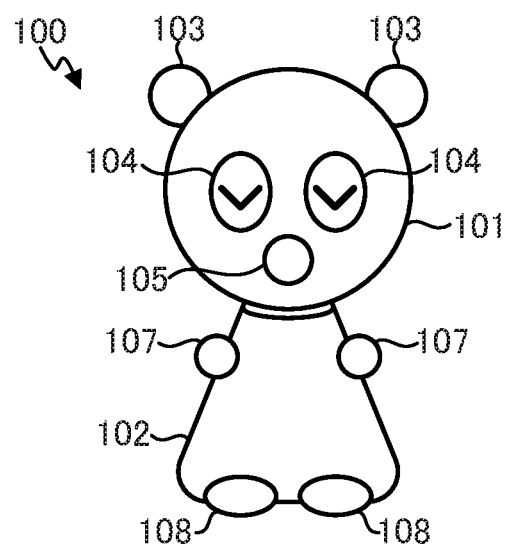
Figure 9C:
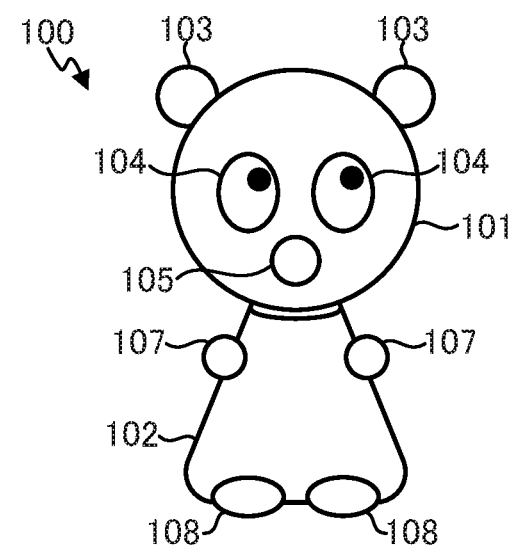

(2) Second, the operation controller 140 causes the operation unit 170 to execute the first operation by changing the images displayed on the displays 117. Specifically, the operation controller 140 may change the images of the irises (pupils) displayed on the displays 117, for example, into images containing larger pupils as illustrated in FIG. 9A, into images of closed eyes as illustrated in FIG. 9B, or into images of displaced pupils as illustrated in FIG. 9C. Alternatively, the operation controller 140 may cause other images to be displayed on the displays 117 such that the robot 100 has tears in the eyes, closes one of the eyes (winks), looks at the predetermined target (makes eye contact), or quickly closes and opens the eyes (blinks).

(3) Third, the operation controller 140 causes the operation unit 170 to execute the first operation by outputting the sound through the sound output device 118. Specifically, the operation controller 140 may cause the sound output device 118 to output the sound, such as a spoken language "What!" or "You looked at me!", to the predetermined target as a response to the viewing direction of the predetermined target. The sound to be output is selected from preset candidates in accordance with a predetermined rule.

In a case in which the viewing direction of the predetermined target is toward the robot 100 at least for the predetermined duration, the operation controller 140 causes the operation unit 170 to execute at least one of these first operations. Specifically, after the recognition of the face of the predetermined target by the image recognizer 119, the operation controller 140 causes the operation unit 170 to execute the first operation, which varies depending on a result of recognition by the image recognizer 119. In other words, the operation controller 140 determines parameters, such as age, sex, and facial expression, of the predetermined target based on the face recognized by the image recognizer 119 and then determines whether to (1) move the movable components 114, (2) change the images displayed on the displays 117, (3) output the sound through the sound output device 118, or execute a combination of these operations, depending on a result of determination on the parameters. The robot 100 can thus provide various responses for different interaction targets and create a more endearing impression.

Until the elapse of the predetermined duration from when the viewing direction of the predetermined target is turned to the robot 100, the operation controller 140 causes the operation unit 170 to execute the solo operation. In other words, regardless of determination that the viewing direction of the predetermined target is toward the robot 100 by the viewing direction determiner 150, the operation controller 140 causes the operation unit 170 to continue the ongoing solo operation without an operation for responding to the viewing direction until the elapse of the predetermined duration. The operation controller 140 thus enables the robot 100 to pretend not to notice the predetermined target until the elapse of the predetermined duration from when the viewing direction of the predetermined target is turned to the robot 100.

In a case in which the viewing direction determiner 150 determines that the viewing direction of the predetermined target is not toward the robot 100, the operation controller 140 causes the operation unit 170 to execute a second operation different from the first operation. The second operation indicates an operation intended to prompt the predetermined target to have the viewing direction toward the robot 100 and is preliminarily defined as a part of the operation table 190. For example, the operation controller 140 may rotate the head 101 to attract the attention of the predetermined target. Alternatively, the operation controller 140 may drive the legs 108 so that the robot 100 approaches the predetermined target or moves to be located in the viewing direction of the predetermined target.

In a case in which such the second operation succeeds in causing the predetermined target to have the viewing direction toward the robot 100, the operation controller 140 causes the operation unit 170 to start the above-described first operation. In a case in which the predetermined target takes an action, such as a conversation or contact, directed to the robot 100, the operation controller 140 causes the operation unit 170 to execute the interacting operation with the predetermined target. The operation controller 140 thus executes an operation for attracting the attention of the predetermined target in a case in which the predetermined target does not look at the robot 100 during execution of the solo operation by the robot 100. This configuration can make the robot 100 more endearing.

The process executed by the robot 100 having the above-described configuration will now be explained with reference to flowcharts of FIGS. 10 and 11.

A robot controlling process executed by the robot 100 will now be explained with reference to the flowchart of FIG. 10. The robot controlling process illustrated in FIG. 10 is started when activation of the robot 100 and recharge of the battery 112 turn the robot 100 into a normally operable mode.

At a start of the robot controlling process, the CPU 110 determines whether any predetermined target is detected (Step S1) or not. Specifically, the CPU 110 causes the imager 115*a* to capture the image of the circumference of the robot 100. The CPU 110 then analyzes the captured image and determines whether any predetermined target, such as a human or an animal, as an interaction (communication) partner with the robot 100 exists around the robot 100 or not. The CPU 110 thus functions as the target detector 120 in Step S1.

In a case in which no predetermined target as the interaction partner is detected in the determination (Step S1; NO), the CPU 110 remains in Step S1 and waits until detection of any predetermined target.

In contrast, in a case in which any predetermined target as the interaction partner is detected (Step S1; YES), the CPU 110 determines whether to interact with the predetermined target (Step S2) or not. Specifically, the CPU 110 determines whether the sound sensors 115*b*, the contact sensor 115*c*, or the imager 115*a* detects the call, the contact, or the gesture of the predetermined target to the robot 100, for example. In a case in which any action of the predetermined target to the robot 100 is detected, the CPU 110 determines that the robot 100 is to interact with the predetermined target. The CPU 110 thus functions as the action detector 130 in Step S2.

In a case in which determining that the robot 100 is to interact with the predetermined target (Step S2; YES), the CPU 110 causes the robot 100 to execute the interacting operation (Step S3). The interacting operation indicates the operation for interacting with the predetermined target and responding to the action of the predetermined target detected in Step S2. Specifically, the CPU 110 controls the movable components 114, the displays 117, and the sound output device 118 included in the operation unit 170 and thus causes the operation unit 170 to execute the operation corresponding to the detected action. This process enables the robot 100 to interact (communicate) with the predetermined target. The CPU 110 thus functions as the operation controller 140 in Step S3.

In contrast, in a case in which determining that the robot 100 is not to interact with the predetermined target (Step S2; NO), the CPU 110 skips Step S3.

After the interaction with the predetermined target or after skipping Step S3, the CPU 110 determines whether the solo operation condition is satisfied (Step S4) or not. The solo operation condition indicates the condition required for execution of the solo operation by the robot 100. Specifically, the solo operation condition is satisfied in a case in which the predetermined interval has elapsed from the last detection of the action of the predetermined target to the robot 100 in Step S2, or in a case in which at least one of the surrounding environment of the robot 100 and the time satisfies any of the specified conditions listed in FIG. 6. The CPU 110 determines whether the solo operation condition is satisfied or not based on the detection of the surrounding environment by the sensor unit 115 and the time measurement by the clock 110*a*. The CPU 110 thus functions as a solo operation determiner for determining whether the robot 100 is executing the solo operation.

In a case in which the solo operation condition is not satisfied (Step S4; NO), the CPU 110 returns to Step S1 and determines again whether any predetermined target is detected or not. While the predetermined target is being detected with satisfaction of the condition required for the interaction with the predetermined target, the CPU 110 repeats the process from Steps S1 to S4 to continue the interaction with the predetermined target.

In contrast, in a case in which the solo operation condition is satisfied (Step S4; YES), the CPU 110 causes the robot 100 to execute the solo operation (Step S5). Specifically, the CPU 110 controls the movable components 114, the displays 117, and the sound output device 118 included in the operation unit 170 and thus causes the operation unit 170 to execute the solo operation corresponding to the satisfied condition.

For example, in a case in which the predetermined interval has elapsed from the last detection of the action of the predetermined target, the CPU 110 causes the operation unit 170 to execute any of the solo operations listed in FIG. 5 depending on information on the emotions of the robot 100 at that time. In contrast, in a case in which at least one of the surrounding environment of the robot 100 and the time satisfies the specified condition, the CPU 110 causes the operation unit 170 to execute any of the solo operations listed in FIG. 6. The CPU 110 thus functions as the operation controller 140 in Step S5.

During execution of the solo operation by the robot 100, the CPU 110 executes a viewing direction determining process (Step S6). The viewing direction determining process in Step S6 will now be explained in detail with reference to the flowchart of FIG. 11.

Figure 11:
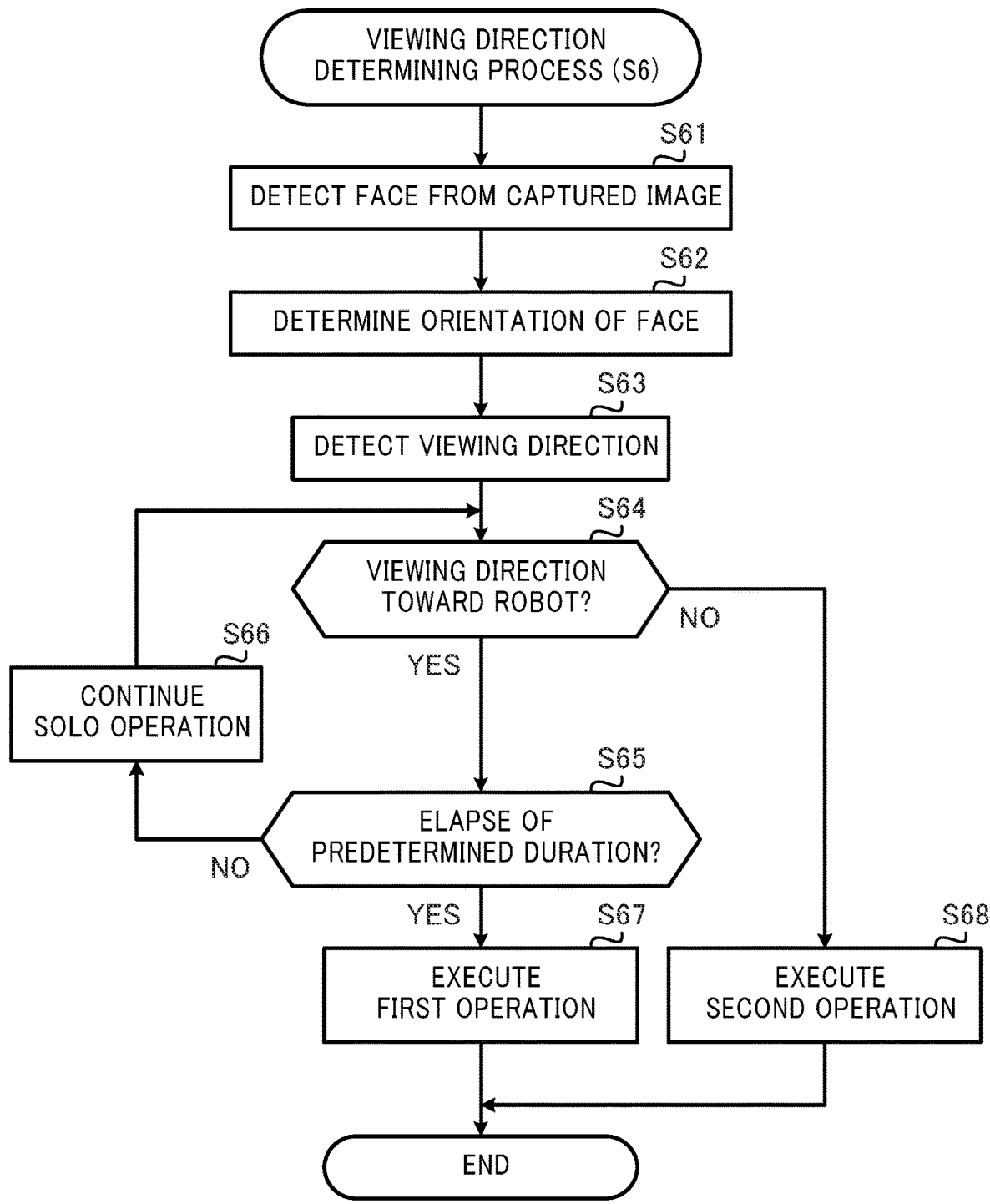
FIG. 11 is a flowchart illustrating a viewing direction determining process executed by the robot according to the embodiment of the disclosure.

At a start of the viewing direction determining process illustrated in FIG. 11, the CPU 110 detects the face from the image captured by the imager 115*a* (Step S61). Specifically, the CPU 110 determines the face area 220 corresponding to the face of the predetermined target in the captured image 200 illustrated in any of FIGS. 7A to 7C, for example, by the well-known face recognition technique.

After detection of the face from the captured image, the CPU 110 determines the orientation of the face (Step S62). Specifically, the CPU 110 determines the orientation of the face in the three directions (the pitch, the roll, and the yaw directions) based on the positional relationship between the facial parts (for example, the eyes, the nose, and the mouth) in the detected face area 220.

After determination of the orientation of the face, the CPU 110 detects the viewing direction of the predetermined target (Step S63). Specifically, the CPU 110 specifies the eyes contained in the face area 220 and determines the direction of a view of the predetermined target based on the positions of the irises in the respective specified eyes.

After detection of the viewing direction, the CPU 110 determines whether the viewing direction of the predetermined target is toward the robot 100 (Step S64) or not. Specifically, in a case in which the detected face is located in the center of the captured image 200 and in a case in which the face and the viewing direction are toward the front, the CPU 110 determines that the viewing direction of the predetermined target is toward the robot 100. In addition, in a case in which the detected face is located in a position other than the center of the captured image 200 and in a case in which the face or the viewing direction is toward the imager 115*a*, the CPU 110 also determines that the viewing direction of the predetermined target is toward the robot 100.

In a case in which determining that the viewing direction of the predetermined target is toward the robot 100 (Step S64; YES), the CPU 110 causes the clock 110*a* to start measuring the time and then determines whether the predetermined duration has elapsed from when the viewing direction of the predetermined target is turned to the robot 100 (Step S65) or not.

In a case in which the predetermined duration has not elapsed (Step S65; NO), the CPU 110 causes the operation unit 170 to continue the solo operation (Step S66). The CPU 110 then returns to Step S64 and determines again whether the viewing direction of the predetermined target is toward the robot 100 or not. In other words, even after determination that the viewing direction of the predetermined target is toward the robot 100, the CPU 110 causes the robot 100 to continue the ongoing solo operation and pretend to not to notice the viewing direction until the elapse of the predetermined duration. The CPU 110 then determines whether the viewing direction of the predetermined target is toward the robot 100 at least for the predetermined duration or not.

In a case in which determining that the viewing direction of the predetermined target is toward the robot 100 at least for the predetermined duration (Step S65; YES), the CPU 110 causes the operation unit 170 to execute the first operation for responding to the viewing direction (Step S67). Specifically, the CPU 110 causes the image recognizer 119 to recognize the face of the predetermined target. Based on the result of face recognition, the CPU 110 causes the operation unit 170 to execute one or more of the operations including: (1) moving the movable components 114, (2) changing the images displayed on the displays 117, and (3) outputting the sound through the sound output device 118.

In contrast, in a case in which determining that the viewing direction of the predetermined target is not toward the robot 100 in Step S64 (Step S64; NO), the CPU 110 causes the operation unit 170 to execute the second operation (Step S68). Specifically, the CPU 110 prompts the predetermined target to have the viewing direction toward the robot 100 by rotating the head 101 or displacing the robot 100.

The viewing direction determining process illustrated in FIG. 11 is then terminated. In the viewing direction determining process illustrated in FIG. 11, the CPU 110 functions as the viewing direction determiner 150 from Steps S61 to S65 and functions as the operation controller 140 from Steps S66 to S68.

Referring back to FIG. 10, after the viewing direction determining process, the CPU 110 returns to Step S1 and determines again whether any predetermined target is detected or not. In a case in which any predetermined target is detected in the determination, the CPU 110 executes the process in Step S2 and the following steps. The CPU 110 thus repeats the interacting operation with the predetermined target or the solo operation while the predetermined target is being detected. During the solo operation, the CPU 110 executes the viewing direction determining process.

As explained above, the robot 100 according to the embodiment determines whether the viewing direction of the predetermined target is toward the robot 100 during the solo operation or not and controls the operation unit 170 based on the result of determination on the viewing direction. The robot 100 can thus respond to the viewing direction and create the more endearing impression.

In particular, even if the viewing direction of the predetermined target is toward the robot 100 according to the embodiment, the operation unit 170 continues the solo operation until the elapse of the predetermined duration. After the elapse of the predetermined duration from when the viewing direction is toward the robot, the operation unit 170 executes the first operation for responding to the viewing direction. The robot 100 thus pretends not to notice the viewing direction toward the robot 100 for a while. Accordingly, the robot 100 can behave like the real animal and create the further more endearing impression.

Modifications

The above-described embodiments of the disclosure are mere examples and should not be construed as limiting the scope of the disclosure. That is, the embodiments of the disclosure may be modified in various manners and these modified embodiments are still involved in the scope of the disclosure.

For example, the robot 100 is the pet robot in the similitude of the small dog in the embodiments. Alternatively, the robot 100 according to the disclosure may have a shape other than the shape that represents the small dog. For example, the robot 100 according to the disclosure may be a robot similar to a large dog, other animal, such as a cat, a mouse, or a rabbit, or a human.

Although the displays 117 are provided to the respective eyes 104 and the imager 115*a* is provided to the mouth 105 in the embodiments, the displays 117 may be provided to the components other than the eyes 104 and the imager 115*a* may be provided to the component other than the mouth 105 (for example, a nose) according to the disclosure. In a case in which the displays 117 are not provided to the eyes 104, the operation controller 140 controls the direction of the view of the robot 100 by mechanically moving the eyeball components.

In a case in which the viewing direction of the predetermined target is toward the robot 100 at least for the predetermined duration, the operation controller 140 causes the operation unit 170 to execute the first operation, which varies depending on the result of recognition by the image recognizer 119 in the embodiments. Alternatively, the operation controller 140 according to the disclosure may cause the operation unit 170 to execute the first operation, which varies depending on the distance to the predetermined target measured by the distance sensor 115*d*. For example, in a case in which the distance to the predetermined target measured by the distance sensor 115*d* is shorter than a predetermined distance, the operation controller 140 may change the images displayed on the displays 117 in the first operation. In this case, the operation controller 140 may adjust the images displayed on the displays 117 such that the direction of view of the robot 100 is displaced from the eyes of the predetermined target, so as to reduce a feeling of pressure due to a short distance.

Alternatively, in a case in which the viewing direction of the predetermined target is toward the robot 100 at least for the predetermined duration, the operation controller 140 may cause the operation unit 170 to execute the first operation, which varies depending on whether the robot 100 looks at the predetermined target or not. For example, in a case in which the robot 100 looks at the predetermined target, the operation controller 140 may control the movable components 114, the displays 117, and the sound output device 118, as illustrated in FIGS. 8A to 8C and FIGS. 9A to 9C. In a case in which the robot 100 does not look at the predetermined target, the operation controller 140 may control the movement of the head 101 and the display on the eyes 104 such that the robot 100 looks at the predetermined target. Alternatively, the operation controller 140 may cause the operation unit 170 to execute the first operation, which varies depending on the ongoing solo operation.

In the robot 100 according to the embodiments, the CPU 110 executes the program stored in the ROM and thus functions as each of the target detector, the action detector, the operation controller, and the viewing direction determiner. Alternatively, the robot 100 according to the disclosure may include dedicated hardware, such as an application specific integrated circuit (ASIC), a field programmable gate array (FPGA), or any of various control circuits, which functions as each of the target detector, the action detector, the operation controller, and the viewing direction determiner, instead of the CPU. In this case, the functions of these components may be achieved by respective pieces of hardware or may be comprehensively achieved by a single piece of hardware. Alternatively, a part of the functions of the components may be achieved by the dedicated hardware and the other part may be achieved by software or firmware.

The disclosure can provide the robot that preliminarily has a configuration to achieve the functions according to the disclosure. The disclosure can also provide a program that enables an existing information processing system, for example, to function as the robot according to the disclosure. That is, in a case in which the program for achieving the functional configurations of the robot 100 illustrated in the embodiments is applied to and executed by, for example, the CPU for controlling the existing information processing system, the system can function as the robot according to the disclosure.

The program may be applied by any procedure. For example, the program may be stored for application in a non-transitory computer-readable recording medium, such as a flexible disk, a compact disc read-only memory (CD-ROM), a digital versatile disc read-only memory (DVD-ROM), or a memory card. Alternatively, the program may be superimposed on a carrier wave and applied via a communication medium, such as the Internet. For example, the program may be posted on a bulletin board system (BBS) on a communication network and thus delivered. In this case, when activated and executed under the control of operating system (OS) as well as other application programs, the program may enable the above processes to be executed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative sense rather than a restrictive sense. This detailed description, therefore, is not to be taken in a limiting sense, and the scope of the invention is defined only by the included claims, along with the full range of equivalents to which such claims are entitled.

What is claimed is:

1. A robot comprising:
    an operation unit that causes the robot to operate;
    a viewing direction determiner that determines whether a viewing direction of a predetermined target is toward the robot;
    an operation controller that controls the operation unit based on a determination result by the viewing direction determiner; and
    a solo operation determiner that determines whether the robot is executing a spontaneous solo operation, the solo operation being executed by the robot alone independently from the predetermined target in a case in which the predetermined target exists around the robot, and the solo operation being an operation not involving interaction with the predetermined target,
    wherein in a case in which the solo operation determiner determines that the robot is executing the solo operation, the viewing direction determiner determines whether the viewing direction of the predetermined target is toward the robot.

2. The robot according to claim 1, further comprising:
    an imager that captures an image of the predetermined target,
    wherein the viewing direction determiner determines whether the viewing direction is toward the robot based on the image of the predetermined target captured by the imager.

3. The robot according to claim 1, wherein in a case in which the solo operation determiner determines that the robot is not executing the solo operation, the viewing direction determiner does not determine whether the viewing direction is toward the robot or not.

4. The robot according to claim 1, wherein in a case in which the viewing direction determiner determines that the viewing direction is toward the robot, the operation controller causes the operation unit to execute a first operation.

5. The robot according to claim 4, wherein:
    in a case in which the solo operation determiner determines that the robot is executing the solo operation, the viewing direction determiner determines whether the viewing direction is toward the robot at least for a predetermined duration, and
    in a case in which the viewing direction determiner determines that the viewing direction is toward the robot at least for the predetermined duration, the operation controller causes the operation unit to execute the first operation.

6. The robot according to claim 5, wherein the operation controller causes the operation unit to continue executing the solo operation so that the robot pretends not to notice that the viewing direction is toward the robot until elapse of the predetermined duration from when the viewing direction determiner determines that the viewing direction is turned toward the robot.

7. The robot according to claim 4, wherein:
    the operation unit includes a movable component, and
    the operation controller causes the operation unit to execute the first operation by moving the movable component.

8. The robot according to claim 7, wherein:
    the movable component comprises a head or a tail of the robot, and
    the operation controller causes the operation unit to execute the first operation by moving the head or wagging the tail.

9. The robot according to claim 4, wherein:
the operation unit includes a display that displays an image, and
the operation controller causes the operation unit to execute the first operation by changing the image displayed on the display.

10. The robot according to claim 4, wherein:
the operation unit includes a sound output device that outputs a sound, and
the operation controller causes the operation unit to execute the first operation by outputting the sound through the sound output device.

11. The robot according to claim 4, further comprising:
an image recognizer that recognizes a face of the predetermined target,
wherein the first operation that the operation controller causes the operation unit to execute varies depending on a result of recognition by the image recognizer.

12. The robot according to claim 4, wherein in a case in which the viewing direction determiner determines that the viewing direction is not toward the robot, the operation controller causes the operation unit to execute a second operation different from the first operation.

13. The robot according to claim 1, further comprising:
an action detector that detects an action of the predetermined target directed to the robot,
wherein in a case in which the action detector detects the action, the operating unit executes an interacting operation for responding to the action, and
wherein in a case in which the action detector detects no action, the operating unit executes the solo operation after elapse of a predetermined interval from a last detection of the action.

14. The robot according to claim 1, wherein the predetermined target is a human, an animal, or another robot different from the robot.

15. The robot according to claim 1, wherein the solo operation is defined based on information on emotions of the robot, information on surrounding environment of the robot, or information on time.

16. The robot according to claim 12, wherein:
the information on the emotions of the robot comprises information regarding a combination of a first emotional value and a second emotional value, the first emotional value representing a level of calmness, and the second emotional value representing a level of excitement, and
the operation controller changes the emotions of the robot by varying the first emotional value and the second emotional value in response to an action of the predetermined target during the interaction with the predetermined target.

17. The robot according to claim 15, wherein the information on the surrounding environment of the robot comprises information on an outside of the robot except for the predetermined target, the information including a sound volume, a temperature, an atmospheric pressure, a brightness, and existence of an obstacle.

18. The robot according to claim 15, wherein the information on the time includes a current time, a current date, and a current season.

19. The robot according to claim 12, wherein the second operation is an operation for prompting the predetermined target to direct the viewing direction toward the robot.

20. The robot according to claim 19, wherein the second operation comprises rotation of a head of the robot or displacement of the robot.

21. A method of controlling a robot, the method comprising:
causing the robot to operate;
determining whether the robot is executing a spontaneous solo operation, the solo operation being executed by the robot alone independently from a predetermined target in a case in which the predetermined target exists around the robot, and the solo operation being an operation not involving interaction with the predetermined target;
determining, in a case in which it is determined that the robot is executing the solo operation, whether a viewing direction of the predetermined target is toward the robot; and
controlling operation of the robot based on a result of the determination with respect to the viewing direction.

22. A non-transitory recording medium storing a program thereon, the program being executable to control a computer of a robot to function as:
an operation unit that causes the robot to operate;
a viewing direction determiner that determines whether a viewing direction of a predetermined target is toward the robot;
an operation controller that controls the operation unit based on a determination result by the viewing direction determiner; and
a solo operation determiner that determines whether the robot is executing a spontaneous solo operation, the solo operation being executed by the robot alone independently from the predetermined target in a case in which the predetermined target exists around the robot, and the solo operation being an operation not involving interaction with the predetermined target,
wherein in a case in which the solo operation determiner determines that the robot is executing the solo operation, the viewing direction determiner determines whether the viewing direction of the predetermined target is toward the robot.

* * * * *

UNITED STATES PATENT AND TRADEMARK OFFICE
CERTIFICATE OF CORRECTION

PATENT NO. : 11,000,952 B2
APPLICATION NO. : 16/016325
DATED : May 11, 2021
INVENTOR(S) : Kouichi Nakagome Page 1 of 1

It is certified that error appears in the above-identified patent and that said Letters Patent is hereby corrected as shown below:

In the Claims

Column 17, Line 41 (Claim 16, Line 1), delete "claim 12," and insert --claim 15,--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*